United States Patent Office 3,471,528
Patented Oct. 7, 1969

3,471,528
METHOD FOR PRODUCING $\Delta^{9(11)}$ UNSATURATION IN ESTRONE AND RELATED COMPOUNDS
William H. W. Lunn and Eugene Farkas, Indianapolis, Ind., assignors to Eli Lilly and Company, Indianapolis, Ind., a corporation of Indiana
No Drawing. Filed Feb. 21, 1968, Ser. No. 707,279
Int. Cl. C07c *167/14, 169/10, 169/34*
U.S. Cl. 260—397.45
4 Claims

ABSTRACT OF THE DISCLOSURE

A $\Delta^{9(11)}$ unsaturation is produced in estrone and related compounds by reaction with the adamantonium ion.

BACKGROUND OF THE INVENTION

The desirability of producing $\Delta^{9(11)}$ unsaturation in steroids dates back to the initial attempts of Kendall and co-workers to prepare 11-oxygenated compounds of the corticosterone series therefrom by hydration or oxidation. [Turner et al., J. Biol. Chem. 162, 571 (1946), 166, 345 (1946) and later papers.] The developement of the less expensive fermentation methods for inserting an oxygen at 11 practically ended research aimed at chemical methods of oxygenating the $C_{11}$ carbon atom, including processes involving the use of a compound containing a $\Delta^{9(11)}$ unsaturation. Fermentation methods of introducing an oxygen at $C_{11}$, however, are not as useful with steroids having a benzenoid A ring belonging to the estrone series as with the pregnanes. Recent interest in chemical methods for introducing a $\Delta^{9(11)}$ unsaturation into estrone, ethinylestradiol and related compounds is evidenced by a U.S. Patent 3,151,134, issued Sept. 29, 1964. According to this patent, a quinone is employed as the unsaturation-producing reagent. The reaction generally yields a mixture of $\Delta^{9(11)}$ and $\Delta^{8(9)}$ steroids.

It is an object of this invention to provide a method for introducing a $\Delta^{9(11)}$ unsaturation into a steroid having a benzenoid A ring in better yields than has heretofore been possible, and without any admixture of a $\Delta^{8(9)}$ byproduct steroid.

SUMMARY OF THE INVENTION

This invention provides a method for preparing a compound represented by the following formula:

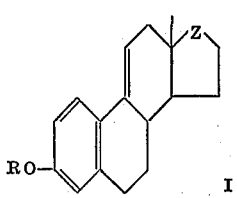

wherein R is hydrogen or $C_1$–$C_3$ alkyl and Z is a member of the group consisting of

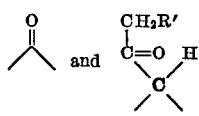

wherein R' is hydrogen or hydroxy, which comprises treating a compound of the formula

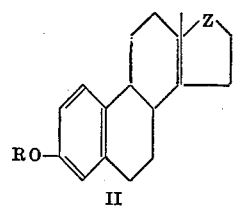

wherein R and Z have the same meaning as hereinabove, with an adamantanol and a mineral acid in an inert, non-polar solvent.

In the above formulas, when R is a $C_1$–$C_3$ alkyl group, it can be methyl, ethyl, n-propyl or isopropyl.

Compounds of this invention coming within the ambit of Formula I above include:

$\Delta^{9(11)}$ estrone
$\Delta^{9(11)}$ 3-methoxyestrone
19-norpregna-1,3,5(10),9(11)-tetraen-3-ol-20-one
3-methoxy-19-norpregna-1,3,5(10),9(11)-tetraen-3-ol-20-one
19-norpregna-1,3,5(10),9(11)-tetraene-3,21-diol-20-one Starting material useful in preparing the above compounds as well as their congeners are either well known in the art or are synthesizable by standard procedures from readily available materials.

The process of this invention is carried out as follows: A steroid corresponding to Formula II above and having a benzenoid A ring is dissolved in an inert non-polar solvent, including aliphatic, either cyclic or alicyclic, hydrocarbons. A mineral acid is added and the mixture stirred in an inert atmosphere at a temperature in the range —25° C. to 0° C. An adamantanol, such as 1-adamantanol, 3-methyl-1-adamantanol, 3,5-dimethyl-1-adamantanol and 3,5,7-trimethyl-1-adamantanol is added rapidly and with stirring to the resultant mixture. The reaction forming the $\Delta^{9(11)}$ unsaturation is extremely rapid and, shortly after the addition of the adamantanol has been completed, the reaction is quenched by pouring onto cracked ice with stirring. The product of the reaction, a compound corresponding to Formula I above containing a $\Delta^{9(11)}$ unsaturation, is extracted from the aqueous mixture with chloroform, methylene dichloride or other suitable water-immiscible solvent. The extract is separated and dried, and the solvent removed therefrom by evaporation. Adamantane, a by-product in the reaction, is removed from the solid residue by trituration with an inert, aliphatic hydrocarbon solvent. The steroid compound which remains is purified as by recrystallization, chromatography, or other suitable means.

In carrying out the process of this invention, any of the common mineral acids may be employed including sulfuric, fluosulfonic, hydrochloric, phosphoric and the like acids, as well as the strong organic acids. Aliphatic hydrocarbon solvents which are suitable dispersants for the reaction include n-pentane, n-hexane, cyclohexane, etc. These aliphatic hydrocarbons are most readily available under the generic name petroleum ethers, various fractions of which (A–G) contain either pure aliphatic alicyclic or cyclic hydrocarbons or mixtures thereof.

The process of this invention is particularly advantageous in that there is no evidence for the presence of any Δ8(9) derivative in the crude reaction product, as measured by nuclear magnetic resonance spectrum or other sensitive analytical method. It is the presence of this difficultly separable by-product which reduces the efficiency of previous methods from preparing Δ9(11) derivatives from estrone and related compounds. Yields of Δ9(11) compound as high as 60 percent have been obtained when fluosulfonic acid has been used as the mineral acid.

The compounds of this invention are useful as intermediates for the preparation of 19-nor steroids having an oxygen function at 11. For example, U.S. Patent 3,207,753 discloses a process for producing compounds of the pregnane and androstane series and employs as a starting material a Δ9(11) compound which is epoxidized and converted to an 11-hydroxy derivative by opening of the epoxide ring. The utilities for the compounds preparable according to U.S. Patent 3,207,753 include pituitary inhibition, anti-androgenicity, and cholesterol lowering. In particular, the patent states that 19-nor-9β,10α-testosterone (retrotestosterone), which can be prepared by methods outlined in U.S. Patent 3,207,753, is an anabolic agent with a favorable anabolic/androgenic ratio.

This invention is further illustrated by the following specific examples.

Example I

A mixture containing 13.5 g. of estrone, 37.5 ml. of 18 M sulfuric acid and 200 ml. of n-pentane was stirred under a nitrogen atmosphere at about −10° C. 8.25 g. of 1-adamantanol was added over a five-minute period. Stirring was continued for an additional 10 minutes after which time the mixture was poured over 200 g. of cracked ice. The aqueous layer was extracted with chloroform. The chloroform extract was separated, washed with 10 percent sodium bicarbonate solution and dried. Evaporation of the chloroform in vacuo left a solid residue containing Δ9(11) estrone produced in the above reaction and adamantane. The adamantane was removed by trituration with several volumes of warm n-pentane. Recrystallization of the resulting residue from acetone produced Δ9(11) estrone melting at about 254–258° C.

$\lambda_{max.}^{EtOH} = 263$ m$\mu$ ($\epsilon = 18,200$)

Δ9(11) estrone and estrone travel similarly in thin layer chromatography using a benzene-methanol (19:1) system, but on spraying with acidic cobaltous chloride followed by heating, a green color is produced by the Δ9(11) compound and a pink color with estrone itself.

Example II

A solution was prepared containing 5 g. of estrone in 125 ml. of n-pentane. The solution was cooled to −20° C. and stirred under a nitrogen atmosphere. Twenty-five milliliters of fluosulfonic acid were added followed by 5 g. of 1-adamantanol in portions over a five-minute period. After the addition of the adamantanol had been completed, the reaction mixture was stirred for an additional 10 minutes and the pentane layer decanted. The remaining thick, red oil was poured into 200 ml. of an ice-water mixture. Δ9(11) estrone produced in the above reaction was extracted with methylene dichloride. The methylene dichloride was washed with 10 percent aqueous sodium bicarbonate solution and then dried. Removal of the methylene dichloride in vacuo yielded Δ9(11) estrone.

Example III

The procedure of Example I was repeated, except that concentrated phosphoric acid was substituted for sulfuric acid.

Example IV

The following compounds are prepared by the above procedures:

Δ9(11)-3-methoxyestrone from 3-methoxyestrone
19 - norpregna-1,3,5(10),9(11)-tetraen-3-ol-20-one from 19-norpregna-1,3,5(10)-trien-3-ol-20-one
19-norpregna-1,3,5(10),9(11)-tetraene-3,21-diol-20-one from 19-norpregna-1,3,5(10)-triene 3,21-diol-20-one.

We claim:
1. A process for preparing a compound of the following formula:

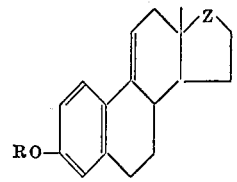

wherein R is hydrogen or $C_1$–$C_3$ alkyl and Z is a member of the group consisting of

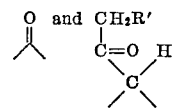

wherein R' is hydrogen or hydroxy,
which comprises treating a compound of the formula

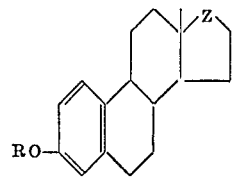

wherein R and Z have the same meaning as hereinabove, with an adamantanol and a mineral acid in an inert, non-polar solvent.

2. A process according to claim 1 in which the mineral acid is fluosulfonic acid.

3. A process according to claim 1 in which the inert, non-polar solvent is a saturated hydrocarbon solvent.

4. A process according to claim 1 wherein estrone is treated with fluosulfonic acid in n-pentane to yield Δ9(11) estrone.

References Cited

UNITED STATES PATENTS

| | | | |
|---|---|---|---|
| 3,151,134 | 9/1964 | Denot et al. | 260—397.45 |
| 3,258,471 | 6/1966 | Alvarez et al. | 260—397.4 |
| 3,385,872 | 5/1968 | Alvarez et al. | 260—397.45 |

LEWIS GOTTS, Primary Examiner

E. G. LOVE, Assistant Examiner